United States Patent [19]
Porumbescu

[11] 4,182,093
[45] Jan. 8, 1980

[54] GRILLE

[75] Inventor: Alexandra A. Porumbescu, Woodbridge, N.J.

[73] Assignee: Construction Specialties, Inc., Cranford, N.J.

[21] Appl. No.: 895,642

[22] Filed: Apr. 12, 1978

[51] Int. Cl.² ............................................. E04C 2/42
[52] U.S. Cl. ........................... 52/663, 52/594; 403/381
[58] Field of Search ............... 52/663, 581, 591, 594; 403/174, 178, 381, 331, 338, 374, 314

[56] References Cited
U.S. PATENT DOCUMENTS

| | | | |
|---|---|---|---|
| 3,086,629 | 4/1963 | Blitzer | 52/663 |
| 3,125,196 | 3/1964 | Fenner | 252/663 X |
| 3,390,506 | 7/1968 | Walters | 52/663 |
| 3,726,055 | 4/1973 | Brant | 52/663 X |

*Primary Examiner*—Carl D. Friedman
*Attorney, Agent, or Firm*—Brumbaugh, Graves, Donohue & Raymond

[57] ABSTRACT

A grille for use as a sun screen, decorative facing, vision barrier or the like is made up of a multiplicity of modular pieces, each of which is of uniform cross section along its length and has walls having spaced-apart, parallel edges defining a base plane and a portion intermediate the edges spaced from the base plane in one direction. An edge flange extends from each edge of the walls of the piece in a direction generally perpendicular to the base plane and opposite from the said one direction, and a pair of spaced-apart slot flanges extends from the intermediate portion of the walls in the said one direction and generally perpendicular to the base plane. The slot flanges define between them a slot that opens generally away from the base plane, the slot having a width at a location nearer the base plane that is greater than its width at a location farther from the base plane. The configuration of the edge flanges is such that adjacent edge flanges of a side-by-side pair of pieces are received in the slot flange of a third piece. A nail-like element driven between the edge flanges of the adjacent pieces urges those edge flanges into tight frictional engagement with the slot flange on the third piece rigidly to interconnect the pieces.

8 Claims, 12 Drawing Figures

GRILLE

BACKGROUND OF THE INVENTION

Grilles of various types and various forms of construction are widely used as sun shades, decorative facings, such as on walls and ceilings, and as vision barriers. It is highly desirable that grilles of this type, particularly when they are of large size, be fabricated in such a way that they can be shipped in knocked-down condition and assembled at the site. It is also desirable with such grilles that the number of different parts involved in the grille be minimized, in the interests of economy and ease of assembly, to keep parts manufacture and on-site erection costs low and minimize the possibility of assembly errors.

SUMMARY OF THE INVENTION

There is provided, in accordance with the present invention, a grille that is constructed from modular elements and which, in its simplest form, uses a single modular piece repeatedly throughout and a single form of connector for interconnecting the pieces into a durable and highly attractive grille. The grille is based on a construction concept which permits considerable versatility as far as the appearance of the grille is concerned, in that the individual modules may be made in a great variety of shapes and sizes. All of the pieces may, as mentioned above, be identical, or as an aspect of the versatility of the invention, the modules may be of different shapes and interconnected in various ways. The modular pieces can be shaped such that they will nest well for efficient shipping, though the desired appearance may warrant sacrificing efficient shipping through nesting to the end that a particular architectural objective can be met.

More particularly, a grille, according to the present invention, comprises a multiplicity of pieces, each of which is of uniform cross section throughout its length and has walls having spaced-apart, parallel edges defining a base plane and a portion intermediate the edges spaced from the base plane in one direction. An edge flange extends from each edge of the walls of the piece in a direction generally perpendicular to the base plane and opposite from the said one direction, and a pair of spaced-apart slot flanges extends from the intermediate portion of the walls in the said one direction and generally perpendicular to the base plane. The slot flanges define between them a slot that opens generally away from the base plane, the slot having a width at a location nearer the base plane that is greater than its width at a location farther from the base plane. Each edge flange has a size and shape in cross section that is substantially the same as the size and shape in cross section of that part of the slot which is located on the opposite side from such edge flange of a medial plane of the slot lying perpendicular to the base plane. The faces of the slot and the faces of the respective edge flanges of each piece nearest each other are, preferably, substantially complementary in shape.

The pieces of the grille are assembled by placing them together side by side in rows. Adjacent pieces in each row are joined to each other and to a third piece in an adjacent row by reception of the edge flanges of the adjacent pieces in the slot of the third piece. A nail-like element, which may be round or otherwise shaped or may be flat and wide, is driven endwise between the edge flanges at each connection point to urge the edge flanges apart and into tight frictional engagement with the slot flanges of the slot that receive them. Preferably the slot of each piece has a cross section that provides for locking or capturing the edge flanges of the adjacent pieces within it, a dovetail shape being preferred.

The pieces making up the grille are made by cutting them to the desired lengths from extrusions. As mentioned, the grille may consist entirely of identical pieces, or it may consist of groups of pieces of different shapes and different sizes or both different shapes and sizes. It will be apparent from the description to follow that there are limits on the dimensional relationships between pieces of different sizes, inasmuch as the connection points between the pieces are located in a grid system which controls such relationships.

The present invention is closely related to an invention entitled "Grille" which is the subject of U.S. patent application Ser. No. 895,644 filed concurrently herewith in the names of Edward C. Hallock, Robert Olsen and George Ennesser.

For a better understanding and a further description of the invention and various aspects and variations thereof, reference may be made to the following description of exemplary embodiments taken in conjunction with the figures of the accompanying drawings.

DESCRIPTION OF EXEMPLARY EMBODIMENTS

Figure 1:
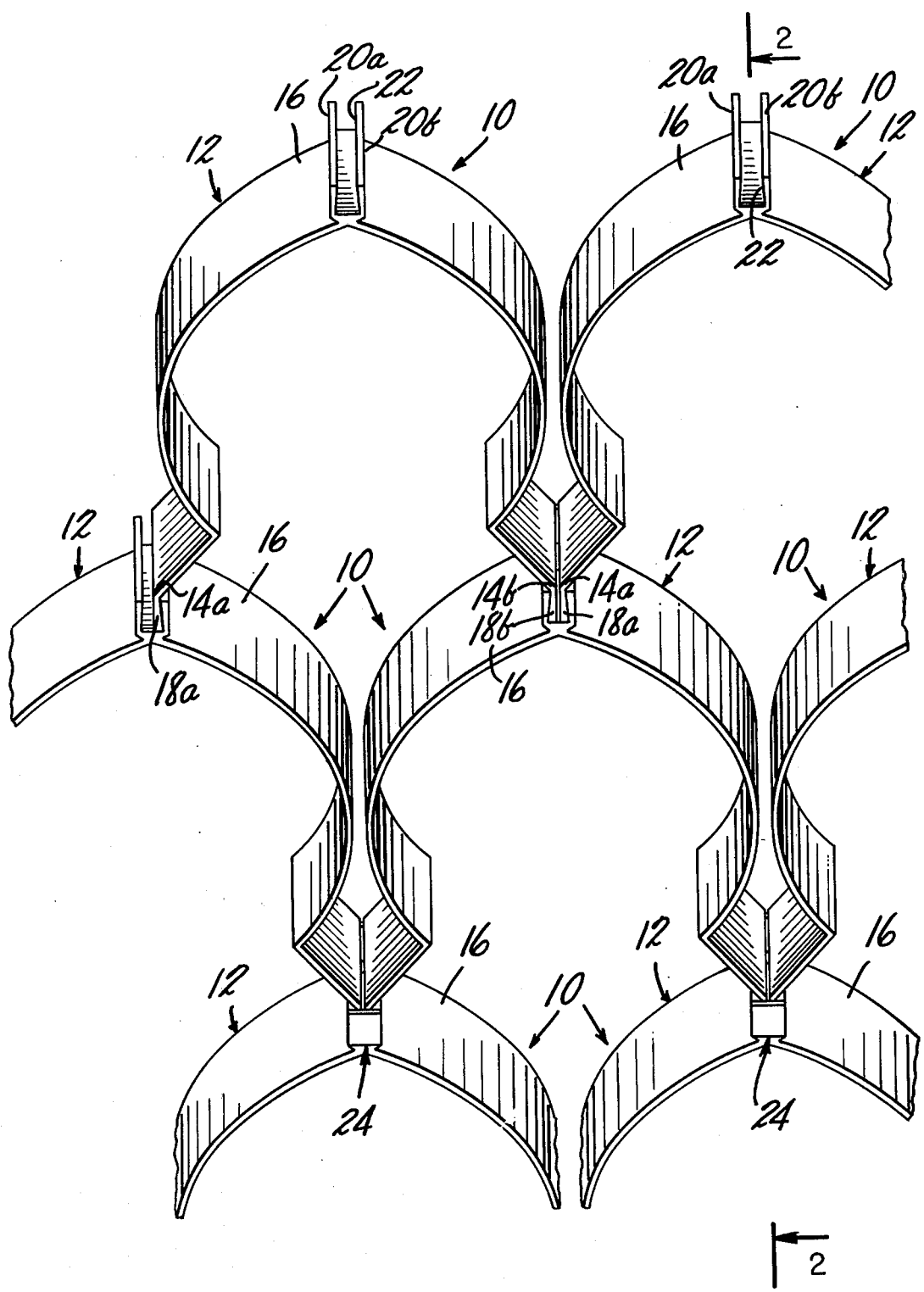
FIG. 1 is a front elevational view of a part of a grille embodying the present invention.
Figure 2:
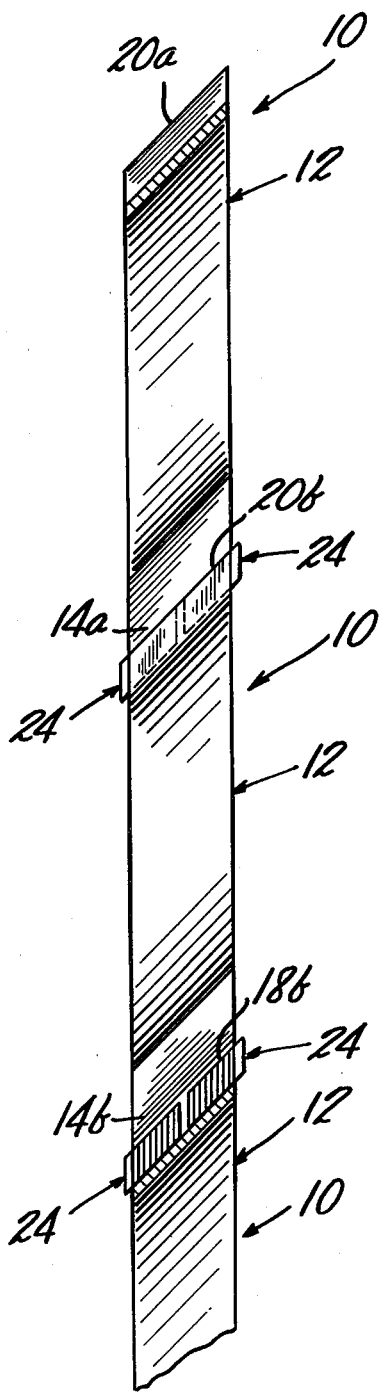
FIG. 2 is an end view in cross section, taken generally along a plane represented by the lines 2—2 of FIG. 1 and in the direction of the arrows.

The grille shown in FIGS. 1 and 2 is constructed from a multiplicity of identical pieces 10, each of which is cut from an extrusion (such as of aluminum or a plastic) and is therefore of uniform cross section along its length. Each piece comprises walls 12 that terminate in parallel, spaced-apart edges 14a and 14b, such edges defining an imaginary base plane. In the grille of FIGS. 1 and 2, the ends of each piece lie in parallel planes that are oblique to the base plane, the pieces having been cut from the extrusion along planes oblique to the base of the extrusion, and the corresponding end planes of all pieces of the grille lie in common front and back face planes (see FIG. 2). Apart from the design of the grille from an architectural point of view, the shape of the walls 12 of each piece 10 is of no consequence and may vary considerably, provided that the shape and size are such that the pieces can be assembled and interconnected; in general, this means that the walls must lie within the imaginary lines of the grid system of the interconnection points, as will hereinafter be apparent. The walls 12 of each piece 10 include an intermediate portion 16 which is spaced in one direction (up in FIG. 1) from the base plane defined by the edges 14a and 14b.

Figure 3A:
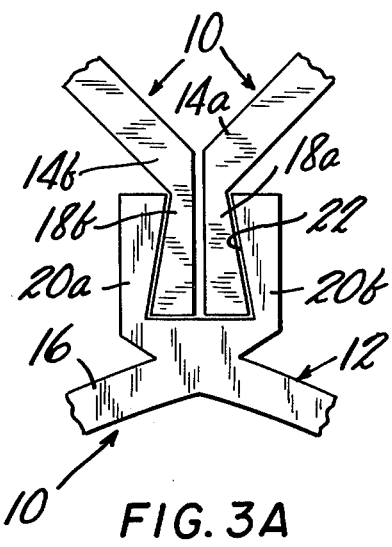
FIG. 3A is an enlarged, fragmentary view depicting the area at the connection between pieces of the grille.

An edge flange 18a and 18b extends from the respective edges 14a and 14b of each piece in the direction (down in FIG. 1) generally perpendicular to the base plane and opposite to the aforementioned one direction. Closely spaced-apart slot flanges 20a 20b extend from the intermediate portion 16 in a direction generally perpendicular to the base plane and in the aforementioned one direction, the slot flanges 20a and 20b defining a slot 22. As may best be seen in FIG. 3A, the slot 22 has a dovetail shape, and each of the respective edge flanges 18a and 18b is of a cross-sectional shape complementary to a part of the slot 22 which lies on one side of a medial plane of the slot 22. Thus, the edge flanges 18a and 18b of two adjacent pieces 10 together make up a male, or tenon, part of a dovetail connection, and the slot 22 of a third piece constitutes the female, or mortise, part of a dovetail connection.

Figure 3B:
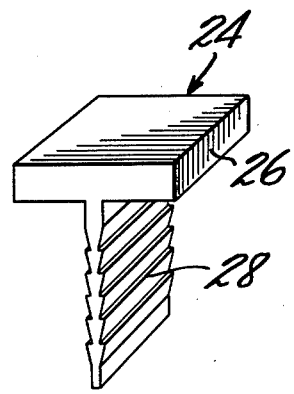
FIG. 3B is a pictorial view of a nail-like element suitable for rigidly securing the pieces at each connection point.
Figure 3C:
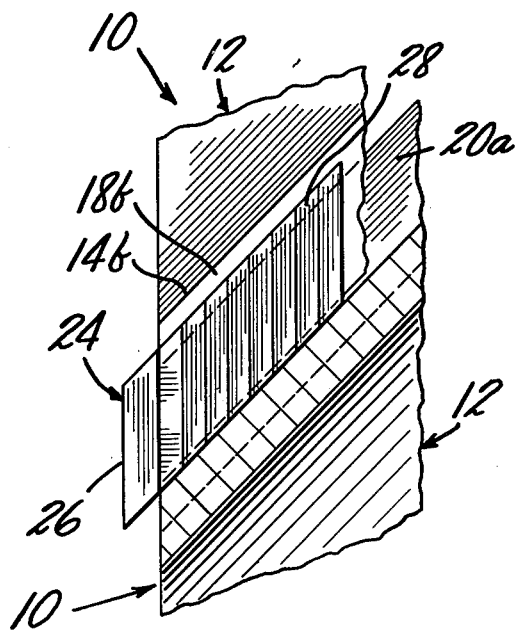
FIG. 3C is an enlarged, fragmentary, cross-sectional view from the side of the area at a connection point between pieces.

The pieces 10 of the grille are interconnected in a grid system defined by the connection points where the edge flanges 18a and 18b of adjacent pieces 10 in one row are received in the slot 22 of a third piece in an adjacent row. In particular, the pieces are arranged side by side in rows, with the pieces of one row staggered between the pieces of the adjacent row. The pieces are assembled by merely sliding them together endwise. After they are assembled, they are rigidly interconnected by driving endwise into one or both ends at each connection point a nail-like element 24 (see particularly FIGS. 3B and 3C) between the edge flanges 18a and 18b of adjacent pieces, thereby to force the edge flanges outwardly into tight frictional engagement with the facing walls of the slot flanges 20a and 20b which define the slot 22 in the third piece. A suitable form of nail-like element 24 for the grille of FIGS. 1 and 2 is made by cutting pieces on a bias from a T-shaped extrusion which consists of a head portion 26 and a shank portion 28, the shank portion 28 having wedge-shaped teeth along both faces for improved gripping with the faces of the edge flanges 18a and 18b that the shank portion engages.

Figure 4:
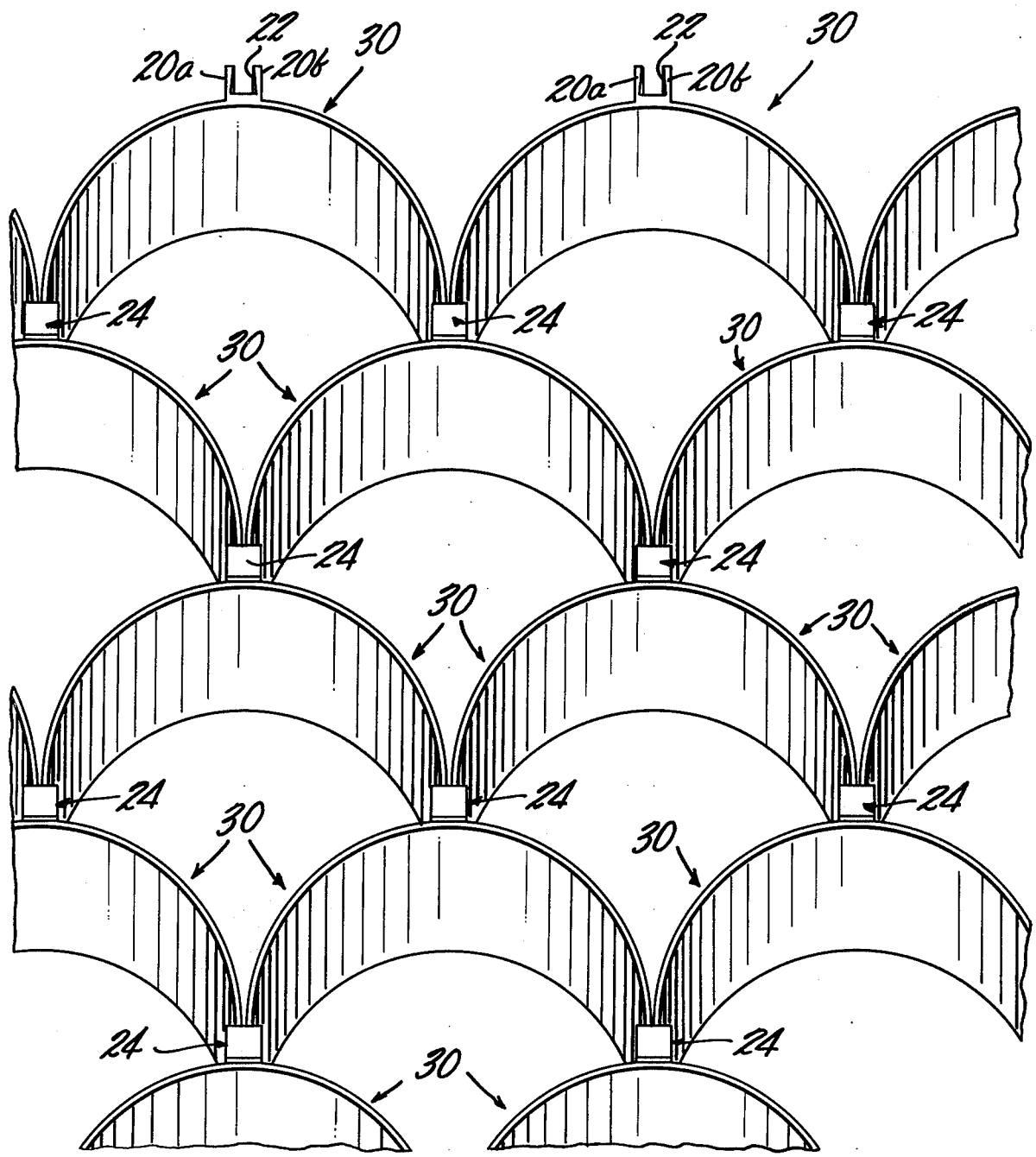
FIG. 4 is a rear elevational view of another embodiment of grille, according to the invention.

The grille shown in FIG. 4 is constructed in a manner identical to that shown in FIG. 1, the only difference between the grille of FIGS. 1 and 2 and that of FIG. 4 being the shape of the walls of each piece. It will be observed that the generally semi-circular pieces 30 of the grille of FIG. 4 will nest well for efficient shipping.

Figure 5:
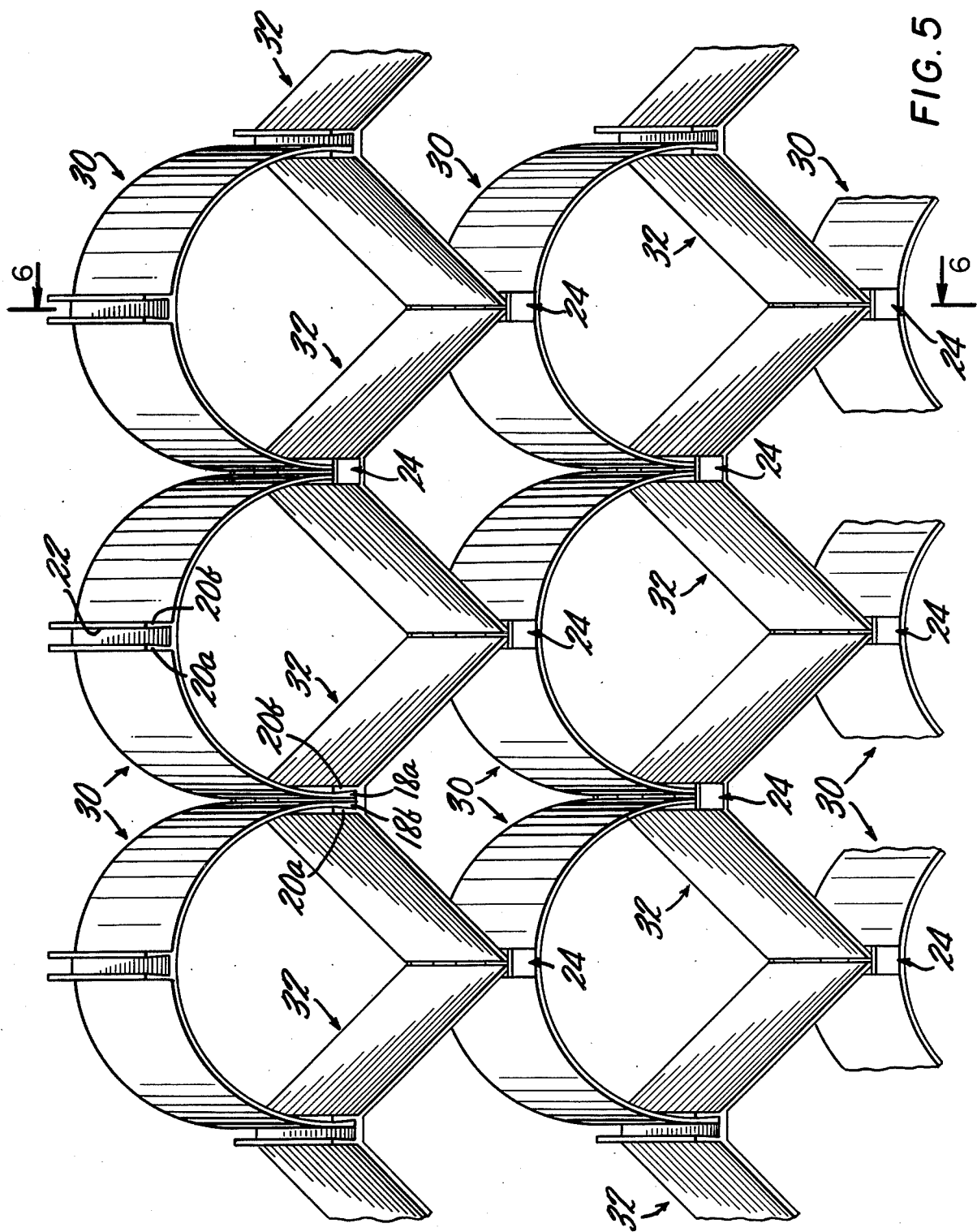
FIG. 5 is a front elevational view of a portion of still another grille embodying the invention.
Figure 6:
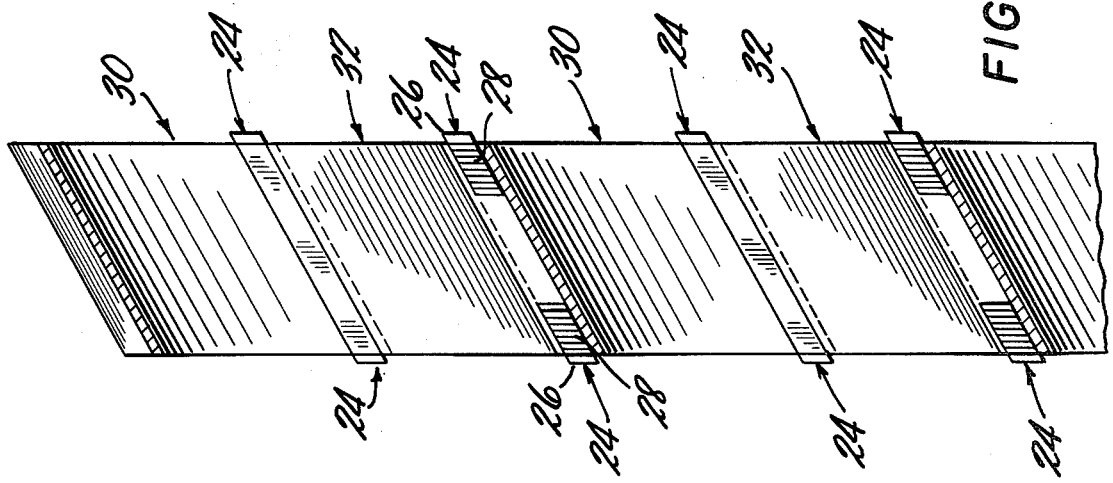
FIG. 6 is an end view in cross section of the grille of FIG. 5, taken generally along a plane represented by the lines 6—6 and in the direction of the arrows.

The grille shown in FIGS. 5 and 6 is based on two sets of pieces, the pieces 30 of one set being of semi-circular profile (see also FIG. 4) and the pieces 32 of the other set being V-shaped (or more precisely, inverted V-shaped). Apart from the different shapes of the walls of the pieces of the grille of FIGS. 5 and 6, the shapes and locations of the edge flanges and slot flanges of the pieces and the nail-like elements used to join the pieces are the same as those of the embodiment of FIGS. 1 and 2. Accordingly, further description of the embodiment of FIGS. 5 and 6 is unnecessary.

Figure 8:
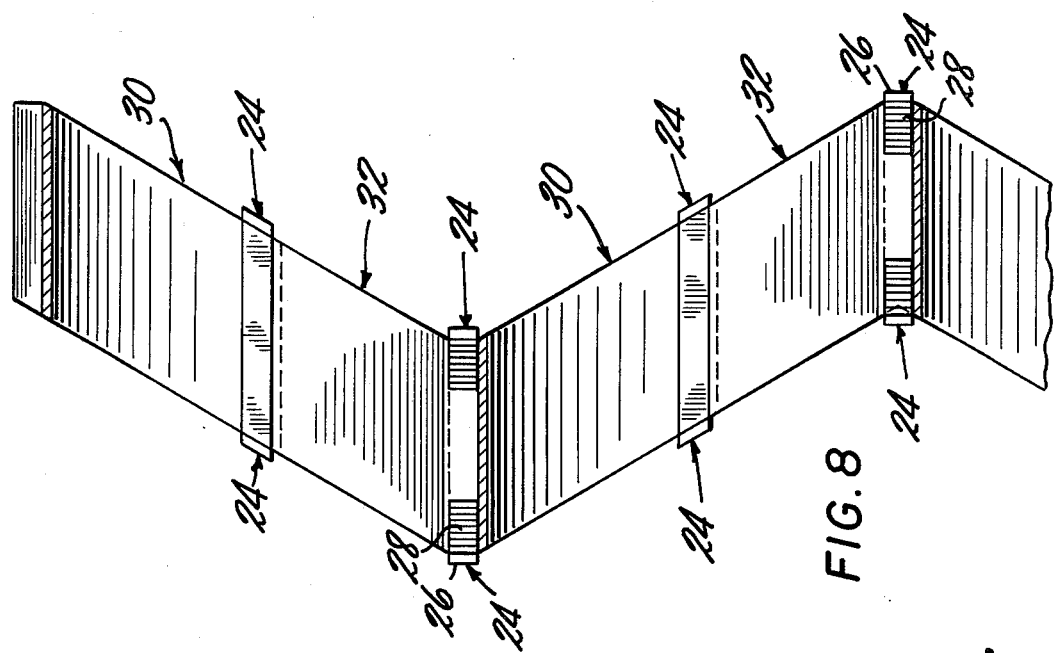
FIG. 8 is an end cross-sectional view of a grille similar to the grille of FIG. 5 showing yet a third way of assembling the same pieces.
Figure 7:
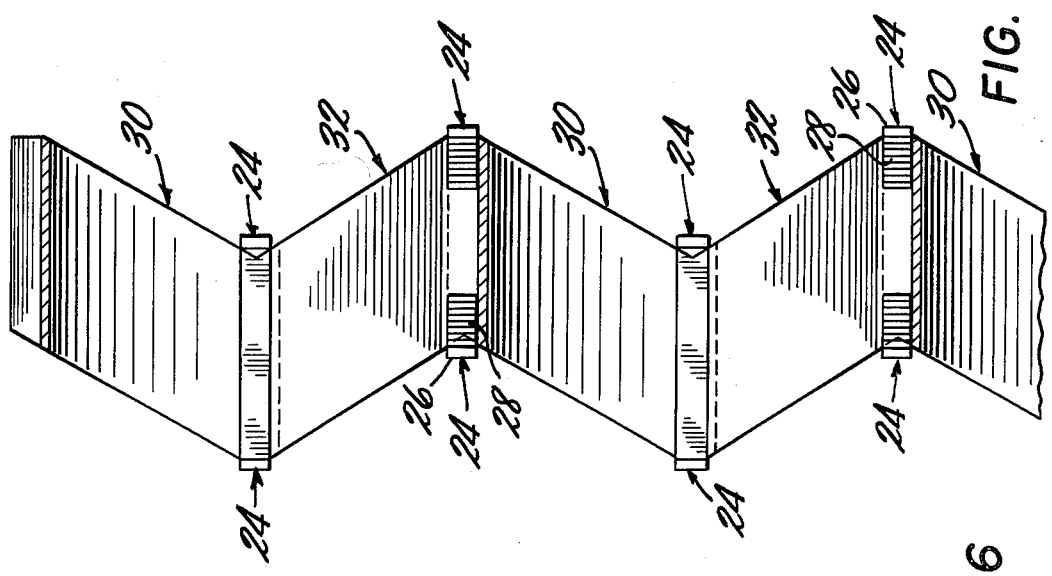
FIG. 7 is an end view in cross section of a grille similar to the grille shown in FIG. 5 but having the pieces assembled differently.

In addition to varying the shapes of the walls and mixing pieces of different shapes with each other in a given grille, FIGS. 6, 7 and 8 illustrate another aspect of the versatility of a grille embodying the present invention. In particular, FIGS. 5 and 6 illustrate a grille composed of the pieces 30 and 32, all of which are cut from the two basic extrusions along planes oblique to the base planes of the extrusions at the same angle and to the same length and are then assembled such that the end planes lie in common front and back face planes of the completed grille. However, by inverting alternate rows of the pieces end for end, the end planes of each row of pieces will intersect end planes of the adjacent rows of pieces at an angle, as shown in FIG. 7, thus making the front and back faces of the grille multifaceted. In this construction, the nail-like elements 24 are cut from the extrusion along planes perpendicular to the axis. As shown in FIG. 8, adjacent pairs of rows of pieces 30 and 32 can be assembled with their end planes defining common face planes and the assembled pairs of row reversed end for end alternately such that the common face planes intersect at angles. Both bias cut and straight cut elements 24 are used to join the pieces.

Figure 9:
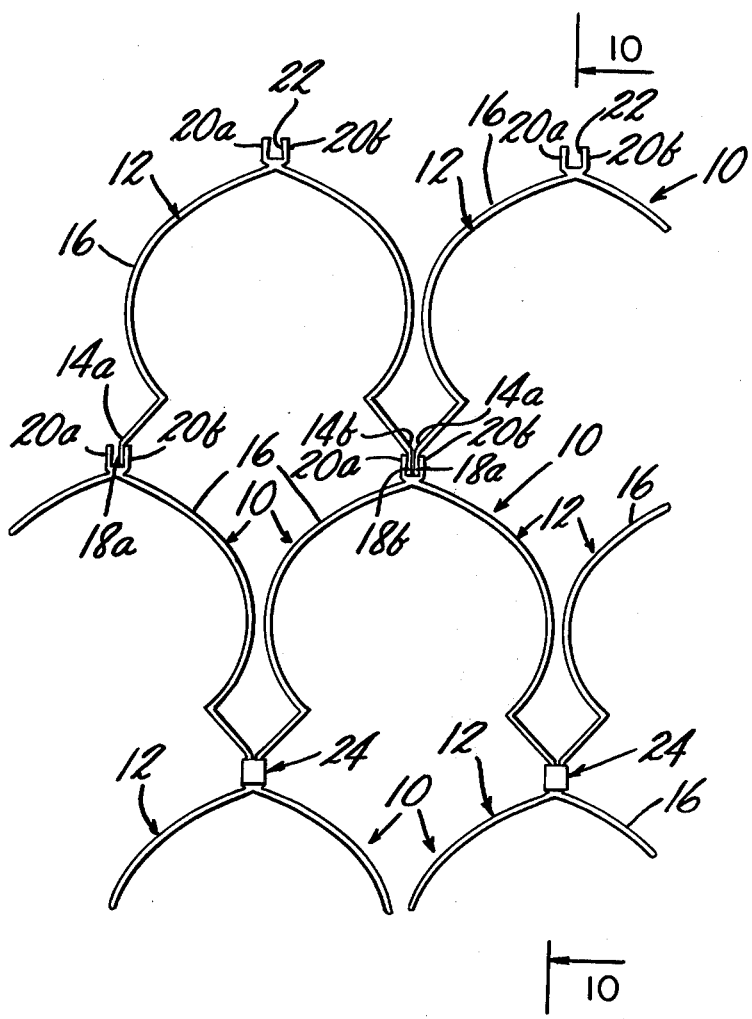
FIG. 9 is a front elevational view of a portion of another embodiment.
Figure 10:
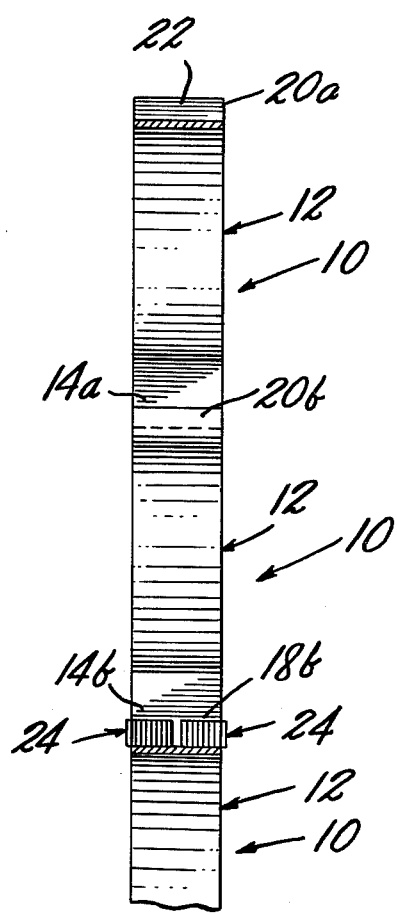
FIG. 10 is an end cross-sectional view of the embodiment of FIG. 9 taken generally along a plane represented by the lines 10—10 of FIG. 9.

The grille shown in FIGS. 9 and 10 is made from pieces 10 cut along planes perpendicular to the axis of the extrusion from which the grille of FIGS. 1 and 2 is constructed. Indeed, the only difference between the grille of FIGS. 1 and 2 and that of FIGS. 9 and 10 is that the end planes of the pieces and, therefore, the face planes of the grille, lie perpendicular, rather than oblique, to the walls. The nail-like elements in the grille of FIGS. 9 and 10 are also cut perpendicular to the axis of the extrusion. In view of the similarities to the grille of FIGS. 1 and 2, reference may be made to the foregoing detailed description of FIGS. 1 and 2 for an understanding of the construction of the grille of FIGS. 9 and 10; the same reference numerals are applied to FIGS. 1 and 2 and 9 and 10.

As mentioned above, and as represented by the several embodiments shown in the drawings, the shapes of the pieces of the grille may vary considerably, even to the point that the pieces may be of complex shapes to produce in each piece or in assemblies of pieces all sorts of designs. For example, it is possible to provide grilles that represent letters, monograms or logos personalized to businesses and institutions occupying buildings in which the grilles are used. It will be apparent from the foregoing that there is also no need for symmetry in the shapes of the walls, although for most geometric designs symmetry will be desirable for aesthetic reasons. It is also unnecessary for the slot of each piece to be midway between the edges of each piece. On the other hand, it is, of course, necessary that the pieces be designed within the grid system of the connecting points. Such a grid system need not be rectilinear, as it is in the case of the embodiments shown in the drawings.

The grilles according to the present invention will, of course, be mounted in a suitable framing system, and such a framing system is well within the skill of the art and is not, therefore, shown in the drawings.

I claim:

1. A piece for a grille comprising walls having (1) spaced-apart parallel edges extending generally in the lengthwise direction of the walls and defining a base plane and, (2) a portion intermediate the edges spaced from the base plane in one direction, an edge flange extending from each edge of the walls of the piece in a direction generally perpendicular to the base plane and opposite from the said one direction, and a pair of spaced-apart slot flanges extending from the intermediate portion of the walls generally in the said one direction and generally perpendicular to the base plane, the slot flanges defining between them a dovetail mortise that opens generally away from the base plane and that extends lengthwise of the intermediate portion along an axis parallel to the said edges of the walls, said mortise being open at at least one lengthwise end thereof, each edge flange having a size and shape in transverse cross section that is substantially the same as the size and shape in transverse cross section of that part of the dovetail mortise which is located on the opposite side from such edge flange of a medial plane of the mortise generally perpendicular to the base plane, the faces of the mortise and the faces of the respective edge flanges nearest each other being substantially complementary such that each edge flange defines one-half of a dovetail tenon, and the piece being unitary and of uniform transverse cross section along an axis parallel to the said edges of the walls.

2. A grille comprising a multiplicity of interconnected unitary pieces, each of such pieces including walls having (1) spaced-apart parallel edges extending generally in the lengthwise direction of the piece and defining a base plane and (2) a portion intermediate the edges spaced from the base plane in one direction, an edge flange extending from each edge of the walls of the piece in the direction generally perpendicular to the base plane and opposite from the said one direction, and a pair of slot flanges extending from the intermediate portion of the walls in the said one direction and generally perpendicular to the base plane, the slot flanges defining between them a dovetail mortise that opens generally away from the base plane and that extends lengthwise of the intermediate portion along an axis parallel to the said edges of the walls, each edge flange having a size and shape in transverse cross section that is substantially the same as the size and shape in transverse cross section of that part of the mortise which is located on the opposite side from such edge flange of a medial longitudinal plane of the mortise lying perpendicular to the base plane, the faces of the mortise and the faces of the respective edge flanges nearest each other being substantially complementary such that each edge flange defines one-half of a dovetail tenon and the piece being of uniform transverse cross section along an axis parallel to the said edges of the walls thereof, the pieces of the grille being interconnected by reception of the edge flanges of adjacent side by side pieces in the mortise of a third adjacent piece, and the grille further comprising means for holding the edge flanges received in each mortise in tight frictional engagement with the slot flanges defining the mortise.

3. A grille according to claim 2, wherein the means holding the flanges in engagement comprises at least one nail-like element received between the edge flanges of the adjacent pieces and urging such end flanges apart.

4. A grille according to claim 2, wherein the opposite ends of each piece in the lengthwise direction thereof define respective parallel planes that are oblique to the base plane of said piece.

5. A grille according to claim 2, wherein the pieces are arranged in rows, each row consisting of side-by-side pieces, the base planes of which lie in a common plane, and wherein the pieces in one row of the grille have shapes in cross section different from the shapes in cross section of the pieces in another row of the grille.

6. A grille according to claim 2, wherein the opposite ends of each piece in the lengthwise direction thereof lie in respective parallel planes that are oblique to the base plane of said piece and wherein said opposite ends of all pieces of the grille define respective spaced-apart parallel planes.

7. A grille according to claim 2, wherein the opposite ends of each piece in the lengthwise direction thereof lie in respective parallel planes oblique to the base plane of said piece, the pieces are interconnected side by side in rows with the base planes of the pieces of each row defining a common plane and wherein the respective planes of said opposite ends of the pieces of one row of the grille lie oblique to the respective planes of said opposite ends of the pieces in another row of the grille.

8. A grille according to claim 7 wherein the respective planes of said opposite ends of the pieces in one row of the grille lie oblique to the respective planes of said opposite ends of an adjacent row of pieces.

* * * * *